Patented June 6, 1950

2,510,771

UNITED STATES PATENT OFFICE 2,510,771

METHOD OF PROTECTING METAL SURFACES AGAINST HYDROGEN SULFIDE CORROSION

Donald C. Bond, Northbrook, and Michael Savoy, Chicago, Ill., assignors to The Pure Oil Company, Chicago, Ill., a corporation of Ohio No Drawing. Application November 1, 1946, Serial No. 707,330

8 Claims. (Cl. 252—8.55)

This invention relates to a method of protecting underground metal equipment against corrosion by hydrogen sulfide, and relates particularly to the prevention of hydrogen sulfide corrosion of the metal parts buried in oil wells drawing sour crudes.

It is an object of the invention to protect oil well casings and tubing against hydrogen sulfide corrosion.

It is a second object of the invention to protect the sucker rods and pumping machinery of an oil well against corrosion by hydrogen sulfide.

It is a third object of the invention to improve upon the efficiency and economy of oil well drilling and operation by reducing the extent of hydrogen sulfide corrosion occurring in the casing, tubes, and machinery in the well.

Other objects and advantages of the invention will in part be obvious, and in part appear hereinafter.

We have discovered that hydrogen sulfide corrosion of the metal parts buried in an oil well can be prevented to a substantial degree by depositing on those metal parts protective films of certain related chemical compounds and materials which are either adsorbed on the metal surfaces or react with the metal surfaces to lay thereon a protective coating impermeable to hydrogen sulfide, or resistant to its corrosive action. In brief, the method of protecting metal surfaces in the oil well comprises injecting into the annular space between the casing and the tubing of the well a solution of a particular compound to contact the casing wall and tubing and pumping it from the well together with crude oil and brine, thereby effectively contacting those surfaces of the well which not only are contacted by fluids drawn from the well, but are exposed to vapors of water, hydrogen sulfide and other corrosive media occurring in wells. The injection of the protective compound is accomplished from the surface in a manner such that the casing of the well is contacted with the compound as it descends to the bottom.

The invention involves the discovery that compositions such as high boiling wood tars, alkaline solutions and extracts thereof, which wood tars contain polyhydroxy phenolic compounds, are effective media for protecting metal surfaces against the corrosive action of hydrogen sulfide in wells.

Many oil fields, for example fields found in west Texas, some in Michigan, Kansas, and Oklahoma, are characterized by the fact that they produce very sour crudes which contain a relatively high proportion of sulfur compounds, and, accordingly, the pumping of the well is accompanied by the evolution of considerable quantities of hydrogen sulfide with its consequent corrosive effect on the well tubing, casing and machinery. The corrosion by hydrogen sulfide is greatly accentuated in the presence of moisture, and inasmuch as moisture is practically always present in an oil well, the corrosion conditions become ideal for the destruction of the metal parts. In many cases experience has shown that the tubing and the sucker rods in the well can be so badly weakened in a period of about thirty days as to break off and require "fishing" in order to remove broken parts for replacement.

As the flow of oil from a well diminishes, the quantity of brine drawn therefrom increases. Since the well will usually give hydrogen sulfide as well as other sulfur compounds, together with crude oil, the increasing quantity of brine in combination with the hydrogen sulfide aggravates the corrosion problem in the well. In due course, as the flow of brine increases, the aggravation of the corrosion attributable to the hydrogen sulfide in the well and enhanced by an increased quantity of brine can hasten the time when it becomes uneconomical to pump the well to strip it further of oil.

In the journal of "Petroleum Technology" for January, 1946, the American Institute of Mining and Metallurgical Engineers, Technical Publication 1970, there appears a good summary and description of the problem of hydrogen sulfide corrosion in oil wells, with a solution devised by the authors, P. L. Menaul and T. H. Dunn. Their solution consisted simply in preserving the metal parts against hydrogen sulfide corrosion by injecting a corrosion inhibitor consisting essentially of an aqueous solution of formaldehyde into the well in quantities sufficient to deposit a protective film on the well parts. The quantity of corrosion inhibitor needed is related to the rate of withdrawal of crude and brine from the oil well, and roughly, is quoted by the authors as being about one quart of solution per 100 barrels of brine pumped from the well.

The aforesaid phenolic substances are very effective protective agents against hydrogen sulfide corrosion. Such substances when placed in alkaline solution and used in the well in the ratio of about 1 gallon of 25 per cent solution per 100 barrels of brine, are effective in substantially completely arresting hydrogen sulfide corrosion of the metal parts in the well. Use of the solution in the quantity indicated represent a ratio of about 1 part of the active inhibiting ingredient to 10,000 parts of brine. Satisfactory results are obtainable with high boiling hard wood tar distillates, for example, those boiling from about 200° to 340° C., which wood tar distillates are typified by the commercial product known as U. O. P. Inhibitor No. 1. Likewise, alkaline solutions of hard wood tar distillates, or alkali extracts of hard wood tar distillates containing about 20 per cent of tar or extract, prevent hydrogen sulfide corrosion of metal parts in the well when used in the ratio of about 1 to 10 quarts per 100 barrels of brine drawn from the well. The wood tar distillates are commonly available commercially as U. O. P. Inhibitor No. 1, hard wood tar distillates sold by the Universal Oil Products Company as inhibitors of gum formation in gasoline. The preparation of the materials is described in the Journal of Industrial and Engineering Chemistry for February 1946, pages 132-135, by A. V. Goos and A. A. Reiter.

The alkaline extracts of hard wood tar distillates referred to are caustic extracts of hard wood tars readily prepared, for example, by contacting 1 volume of steamed settled tar with 10 volumes of 0.5 normal sodium hydroxide solution (or other alkali hydroxide) for a period of about 15 minutes and then separating the caustic solution from the undissolved tar. The caustic extract thus prepared is a very effective inhibitor of hydrogen sulfide corrosion. In the preparation of the extract, the concentration of the caustic solution used and the ratio of volume of caustic to volume of tar extracted are not critical. It is necessary merely to avoid extreme dilution of the active ingredient extracted from the tar.

A typical composition applied to an oil well according to our invention for protecting against hydrogen sulfide corrosion involves injecting a protective solution of 1 part by weight of "I Tar Oil" (a crude settled hard wood tar), or U. O. P. Inhibitor No. 1, 2 parts by weight of 1 normal aqueous sodium hydroxide, and 12 parts by weight of water into the well, the protective solution being injected during a normal day in aliquot parts to maintain a ratio of about 1 quart of the protective solution to about 100 barrels of brine drawn from the well. Similar protective solutions are made up of 1 part by weight of tar oil or U. O. P. Inhibitor No. 1 in about 10 parts of methyl or ethyl alcohol. The compositions and method of practicing the invention and the possibilities for its application will be more readily understood by consideration of the following examples giving some experimental data:

Example I

In an experimental test run in which the protective value of the inhibiting solution for steel exposed to corrosive conditions essentially duplicating those found in a well was measured, the following procedure was carried out: A high-carbon steel rod ¼ inch in diameter and 4 inches long was cleaned, weighed, and placed in a large test tube. To the tube there were then added 3 cc. of oil well brine and 20 cc. crude oil, after which 0.1 cc. of a protective aqueous solution made up of 1 cc. of "I Tar Oil", 2.5 cc. of 1 normal sodium hydroxide and 9 cc. of water was then added. The mixture was then saturated with hydrogen sulfide and the tube sealed and allowed to remain at room temperature for a period of 60 days, after which the tube was opened and the specimen cleaned by washing with acetone and water, and dipping in acid to remove surface sulfides. A determination of weight loss was made as a measure of the protective value of the corrosion inhibitor. The tar oil in the ratio of 1 part of the inhibitor per 1000 parts of brine and oil held the corrosion down to a weight loss of about 0.005 gram in 60 days.

Example II

A similar test was carried out with an aqueous alkaline pyrogallol solution containing 10 per cent of pyrogallol in which the inhibitor was present in the system in a quantity of 1 part to 1000 parts of oil and brine, and it was found that after a period of more than 60 days that the weight loss was only 0.003 gram.

Example III

Pyrogallol in 10 per cent aqueous sodium hydroxide solution as in Example II was added to a test tube containing a steel sample and oil well brine in amount sufficient to establish a ratio of 1 part of pyrogallol to 1000 parts of brine. The tube contents were saturated with hydrogen sulfide, the tube sealed and allowed to stand for 33 days. Upon completion of the period, the tube was opened and the sample cleaned as indicated above. The weight loss determined was only 0.005 gram.

Example IV

Similar tests were carried out with solutions of alkaline "I Tar Oil", methyl and ethyl alcohol solutions of "I Tar Oil", alkaline extracts of U. O. P. Inhibitor No. 1, alcoholic extracts of U. O. P. Inhibitor No. 1, and in all cases it was found that corrosion was materially reduced when the inhibitor was present in the system in the amount of about 1 part per 1000.

Example V

Blank tests were conducted under conditions duplicating those of the previous specific examples with the inhibiting solution left out of the system. In each case it was found that the rate of corrosion of the steel by hydrogen sulfide exceeded 0.05 to 0.1 gram in 30 days.

Results of a few additional tests are briefly summarized in the following tabulation:

TABLE

Corrosion tests in oil well brine saturated with hydrogen sulfide

[Inhibitor/Brine Ratio—1/1000]

| No. | Corrosion Inhibiting Material | Time of Test, Days | Wgt. Loss of Sample, Gm. | Wgt. Loss in Gm./30 Days |
|---|---|---|---|---|
| 1 | None | 33 | 0.1122 | 0.1023 |
| 2 | Pyrogallol | 33 | 0.0054 | 0.0049 |
| 3 | Pyrogallol, sodium salt [1] | 33 | 0.0059 | 0.0054 |
| 4 | Caustic extract of settled hard wood tar | 31 | 0.0002 | 0.0002 |
| 5 | Same as (4), plus 0.36 gm. NaOH per gm. tar extract | 31 | [2] 0.0005 | [2] 0.0005 |
| 6 | Caustic extract of steamed soluble hardwood tar | 30 | 0.0039 | 0.0039 |
| 7 | Same as (6), plus 0.36 gm. NaOH per gm. tar extract | 30 | 0.0039 | 0.0039 |
| 8 | Caustic extract of steamed settled hardwood tar | 30 | 0.0032 | 0.0032 |
| 9 | Same as (8), plus 0.36 gm. NaOH per gm. tar extract | 30 | 0.0038 | 0.0038 |
| 10 | Phloroglucinol | 30 | 0.0076 | 0.0076 |

[1] 1/1000 Pyrogallol+3 mols NaOH per mol pyrogallol.
[2] Gain in wt.

When the protective solutions are applied to the protection of the parts of a well under actual producing conditions, the experimental tests and results are duplicated by injecting periodically an amount of the protective solution to supply the inhibitor in a ratio of about 1 part per 1,000 to 10,000 of brine produced from the well. The protective solution can be injected into the well as an aqueous alkaline, alcoholic, or alkaline alcoholic solution in concentrations which make for convenience in handling and economy in the quantity of material used. In general, it will be found advantageous to use the inhibitor in about 5 to 15 or 20 per cent solution in the solvent carrier.

It has been found that when the inhibitor is injected into the well in the recommended proportions, that shutdowns of the well normally necessitated by corrosion of the parts within the well structure are materially reduced with the consequent improvement in the economy and efficiency of operation of the well.

Since certain changes may be made in carrying out the method described without departing from the scope of the invention, it is intended that all matter contained in the above description shall be interpreted as illustrative and not in a limiting sense.

What is claimed is:

1. The method of protecting metal surfaces against hydrogen sulfide corrosion comprising, contacting said surfaces with a hard wood tar distillate as a protective material.

2. The method in accordance with claim 1 in which the protective material is a hard wood tar fraction having a boiling range from about 200° C. to 340° C.

3. The method in accordance with claim 2 in which the protective material is an alcoholic solution of settled hard wood tar.

4. The method in accordance with claim 2 in which the protective material is a caustic extract of hard wood tar.

5. The method of protecting metal surfaces in oil wells against hydrogen sulfide corrosion comprising, during pumping operations, contacting said surfaces with a water and alkali soluble hard wood tar distillate and maintaining the ratio of about one quart of protective solution to about 100 barrels of brine drawn from the well.

6. The method in accordance with claim 5 in which the protective material is a hard wood tar fraction having a boiling range from about 200° C. to 340° C.

7. The method in accordance with claim 6 in which the protective material is an alcoholic solution of settled hard wood tar.

8. The method in accordance with claim 6 in which the protective material is a caustic extract of hard wood tar.

DONALD C. BOND.
MICHAEL SAVOY.

REFERENCES CITED

The following references are of record in the file of this patent:

UNITED STATES PATENTS

| Number | Name | Date |
| --- | --- | --- |
| 1,873,083 | Walker | Aug. 23, 1932 |
| 1,873,084 | Walker | Aug. 23, 1932 |
| 2,357,559 | Smith | Sept. 5, 1944 |
| 2,426,317 | Menaul | Aug. 26, 1947 |

FOREIGN PATENTS

| Number | Country | Date |
| --- | --- | --- |
| 303,638 | Germany | Feb. 1, 1918 |